United States Patent
Luttwak et al.

(10) Patent No.: US 10,943,022 B2
(45) Date of Patent: Mar. 9, 2021

(54) SYSTEM FOR AUTOMATIC CLASSIFICATION AND PROTECTION UNIFIED TO BOTH CLOUD AND ON-PREMISE ENVIRONMENTS

(71) Applicant: Microsoft Technology Licensing, LLC, Redmond, WA (US)

(72) Inventors: Ami Menachem Luttwak, Binyamina (IL); Yuval Eldar, Shoham (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 317 days.

(21) Appl. No.: 15/942,235

(22) Filed: Mar. 30, 2018

(65) Prior Publication Data

US 2019/0272383 A1   Sep. 5, 2019

Related U.S. Application Data

(60) Provisional application No. 62/638,616, filed on Mar. 5, 2018.

(51) Int. Cl.
  *G06F 21/62*   (2013.01)
  *G06F 21/60*   (2013.01)
  (Continued)

(52) U.S. Cl.
  CPC .......... *G06F 21/6209* (2013.01); *G06F 21/52* (2013.01); *G06F 21/604* (2013.01);
  (Continued)

(58) Field of Classification Search
  CPC .. G06F 21/6209; G06F 21/52; G06F 21/6218; G06F 21/604; G06F 21/6281;
  (Continued)

(56) References Cited

U.S. PATENT DOCUMENTS 9,246,944 B1 *   1/2016   Chen .................... H04L 63/105
10,356,128 B1 *  7/2019   Lango .................. H04L 9/3234
(Continued)

OTHER PUBLICATIONS

"International Search Report and Written Opinion Issued in PCT Application No. PCT/US2019/019471", dated May 13, 2019, 10 Pages.

*Primary Examiner* — Jung W Kim
*Assistant Examiner* — Thomas Ho
(74) *Attorney, Agent, or Firm* — Fiala & Weaver P.L.L.C.

(57) ABSTRACT

Methods, systems, and computer program products are described herein for the classification, tagging, and protection of data objects. Such techniques may be imposed on the data objects automatically regardless of whether the data objects are created/generated/interacted/downloaded/uploaded/accessed on the cloud-based environments and/or on-premises environments. The foregoing techniques are orchestrated from a centralized policy that is treated uniformly regardless of the data objects' environment. Once a data object is identified, it is classified based on multiple criteria and a tag is associated therewith. An enforcement action may be applied to the data objects based on a defined policy. The tag attached to the data object may be used to search for related audit logs that track accesses to the data object. By associating the tag and protection persistently, data object(s) are treated uniformly (i.e., in the same manner) regardless of what environment it is in.

20 Claims, 8 Drawing Sheets

(51) Int. Cl.
*H04L 29/06* (2006.01)
*G06F 21/52* (2013.01)

(52) U.S. Cl.
CPC ........ *G06F 21/6218* (2013.01); *H04L 63/105* (2013.01); *H04L 63/20* (2013.01); *G06F 21/62* (2013.01); *G06F 21/6281* (2013.01); *H04L 63/1441* (2013.01)

(58) Field of Classification Search
CPC ....... G06F 21/62; H04L 63/20; H04L 63/105; H04L 63/1441
See application file for complete search history.

(56) References Cited

U.S. PATENT DOCUMENTS

| | | | | |
|---|---|---|---|---|
| 10,432,669 | B1* | 10/2019 | Badhwar | H04L 63/1408 |
| 2006/0120526 | A1* | 6/2006 | Boucher | G06F 21/6218 380/247 |
| 2009/0328219 | A1* | 12/2009 | Narayanaswamy | H04L 63/1425 726/23 |
| 2011/0209196 | A1* | 8/2011 | Kennedy | G06F 21/121 726/1 |
| 2012/0023217 | A1* | 1/2012 | Wakumoto | H04L 47/10 709/223 |
| 2014/0240088 | A1* | 8/2014 | Robinette | G08B 13/1427 340/5.61 |
| 2015/0020213 | A1* | 1/2015 | Decouteau | G16H 10/60 726/27 |
| 2015/0128213 | A1* | 5/2015 | Steed | H04L 51/12 726/1 |
| 2015/0222646 | A1* | 8/2015 | Diehl | G06F 21/56 726/23 |
| 2016/0179416 | A1* | 6/2016 | Mutha | G06F 3/0619 711/162 |
| 2016/0323309 | A1* | 11/2016 | Sethi | H04L 63/101 |
| 2018/0255092 | A1* | 9/2018 | Thubert | H04L 63/1458 |
| 2018/0352034 | A1* | 12/2018 | Mutreja | H04L 67/327 |
| 2019/0098054 | A1* | 3/2019 | Ramachandran | H04L 63/20 |

* cited by examiner

SYSTEM FOR AUTOMATIC CLASSIFICATION AND PROTECTION UNIFIED TO BOTH CLOUD AND ON-PREMISE ENVIRONMENTS

CROSS REFERENCE TO RELATED APPLICATION

This application claims priority to U.S. Provisional Application Ser. No. 62/638,616, filed Mar. 5, 2018, and titled "System for Automatic Classification and Protection Unified to Both Cloud and On-Premise Environments," the entirety of which is incorporated by reference herein.

BACKGROUND

Information protection solutions are often used separately for on-premises (also known as "on-prem") and cloud environments. The main reason is that there is no current discipline that can address the two environments in a holistic way. This causes security professionals to manage policies to secure data in multiple dashboards. In addition, the enforcement disciplines for on-premise and cloud workloads are different, and therefore, a uniform and reliable policy for both workload types is difficult to implement and maintain. As an example, a file that is identified as confidential on a personal computer (PC) by an on-premise data loss protection (DLP) system may not be identified the same way by a cloud-based DLP system because the systems use different sets of rules. In another example, the cloud-based DLP system and the on-premises DLP system may use different classification engines that do not implement the same identification techniques, resulting in different classifications (e.g., level sensitivity) of a same data object.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are described herein for the classification and protection of data objects. Such techniques may be imposed on the data objects automatically regardless of whether the data objects are created/generated in, interacted with in, downloaded by, uploaded by, and/or accessed by a cloud-based environment or an on-premise environment. Such techniques are orchestrated according to a centralized policy that enables uniform treatment of the data objects regardless of the data objects' environment. Once a data object is identified, it is classified based on multiple criteria (e.g., content, metadata, and context), and a tag classifying the data object is associated thereto. An enforcement action may be applied to the data object based on a defined policy corresponding to the tag. The tag attached to the data object may be used to search for audit logs that track accesses to the data object. By associating the tag persistently, with which consistent protections can be applied, data objects are treated uniformly (i.e., in the same manner) regardless of their environment.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
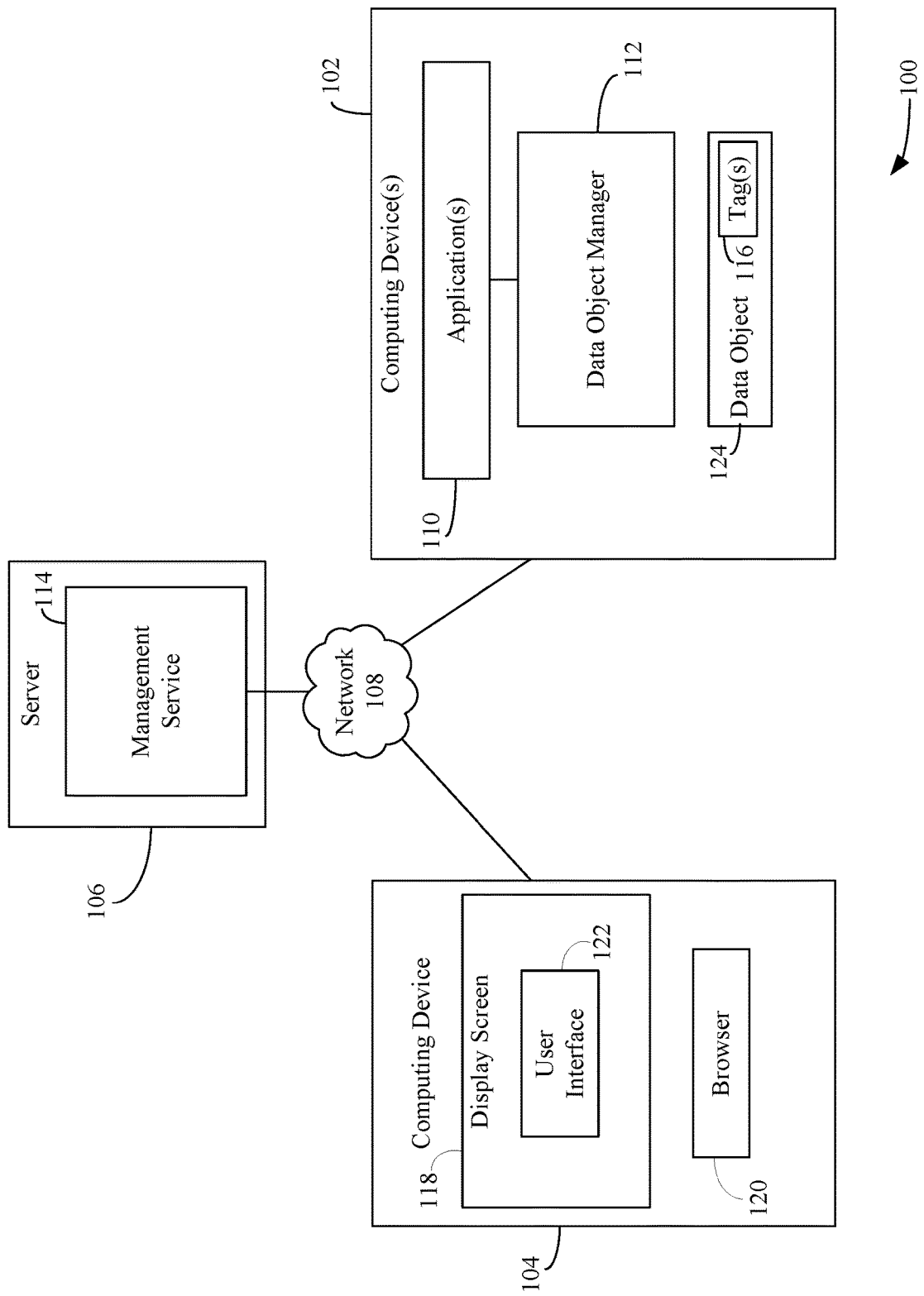
FIG. 1 shows a block diagram of an example system for classifying and protecting a data object, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Classification and Protection for Data Objects

Techniques are described herein for the classification and protection of data objects. Data objects may each be classified based on a set of conditions, which are evaluated by a data object manager of a computing device in which the data objects are stored. The data object manager may maintain one or more tags representative of classifications and associate the tags with the data objects based on how each data object should be handled. The tags persist with the data objects as the data objects are transferred and/or copied from one computing device to another computing device regardless of the computing environment in which the computing devices are located. To protect the data objects and/or the distribution thereof, one or more policies that specify an enforcement action to be taken with respect to the data objects are retrieved and utilized by the data object manager. Each of the policies are associated with tags and are retrievable using the tags. The set of conditions and policies are centrally maintained by a server, which is accessible to a plurality of different computing devices comprising respective data object managers. By maintaining the conditions and policies in a central location that is accessible to a plurality of different computing devices that each include a data object manager. Each data object manager is enabled to retrieve the same set of conditions and the policies (using the tags persistently associated with the data objects), thus allowing each computing device to classify data objects in the same manner and enforce the same policies with respect to the same data object regardless of the computing environment in which the particular computing device is located. This advantageously enables the data objects to be uniformly acted upon (e.g., protected) by all data object managers, thereby ensuring that data, for example, is not unintentionally made available to an undesired party.

For instance, FIG. 1 shows a block diagram of an example system 100 for classifying and protecting data objects, according to an example embodiment. As shown in FIG. 1, system 100 includes a server 106, a computing device 102, and a computing device 104. Each of server 106, computing device 102, and computing device 104 may be communicatively connected to each other via network 108. Network 108 may comprise one or more networks such as local area networks (LANs), wide area networks (WANs), enterprise networks, the Internet, etc., and may include one or more of wired and/or wireless portions. Although a single computing device 102 is shown in FIG. 1, any number of computing devices 102 may be present, including tens, hundreds, thousands, millions, etc. System 100 of FIG. 1 and subsequent systems shown in the figures are generally described as follows with respect a single instance of computing device 102 for purposes of illustration and brevity, although the description applies to any number of computing device 102 in system 100 and other disclosed systems.

Server 106 is configured to execute and/or provide a management service 114. Management service 114 is configured to enable a user (e.g., an administrator) to specify and/or store a set of conditions which are used to classify a data object and/or specify and/or store one or more policies that specify one or more actions (e.g., enforcement actions) to be taken with respect to the data object. For example, management service 114 may enable a user to select and/or configure conditions and/or policies using a graphical user interface (GUI) (also referred to as a management console or dashboard). By interacting with management service 114, the user may generate tags, and associate the tags with the set of conditions and/or policies. Each tag may be defined to have one or more corresponding conditions for being applied to a data object. Each policy may be associated with a corresponding tag, to be performed with respect to a data object tagged with that tag. The tags may be used by other devices (e.g., computing device 102) to search for and/or retrieve the associated policies. The set of conditions, the tags, and/or policies are applicable regardless of a computing environment in which a data object is located, because all computing environments have the same tags for application, and download the same policies associated with those tags. Thus, a single management console or dashboard may be utilized to create and/or configure the set of conditions and/or policies for data objects that can reside in a plurality of different computing environments. Examples of computing environments include, but are not limited to, an environment that is on-premises of a user or company or a cloud platform/architecture (i.e., cloud-based environment) that is maintained by a third party or the user or company.

As described herein, embodiments are applicable to any type of system for system 100 where client devices (e.g., computing device 102 and/or computing device 104) communicate with data servers (e.g., server 106) over a network (e.g., network 108). In accordance with an embodiment, server 106 is included in a cloud platform/architecture. A cloud platform includes a networked set of computing resources, including servers (e.g., server 106), routers, etc., that are configurable, shareable, provide data security, and are accessible over a network (e.g., network 108) such as the Internet. Cloud applications run on the resources, often atop operating systems that run on the resources, for entities that access the applications over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

A user (e.g., an administrator) may be enabled to specify the set of conditions and/or policies by logging into a management console or dashboard provided by management service 114. A user may access the management console via computing device 104. As shown in FIG. 1, computing device 104 includes a display screen 118 and a browser 120. A user may access the management console by interacting with an application at computing device 104 capable of accessing the management console. For example, the user may use browser 120 to traverse a network address (e.g., a uniform resource locator) to server 106, which invokes a user interface 122 (e.g., a web page) in a browser window rendered on computing device 104. By interacting with user interface 122, the user may utilize the management console to specify the set of conditions and/or policies and/or associate tags with the policies. Computing device 104 may be any type of stationary or mobile computing device, including a mobile computer or mobile computing device (e.g., a Microsoft® Surface® device, a laptop computer, a notebook computer, a tablet computer such as an Apple iPad™, a netbook, a smart phone etc.), a wearable computing device (e.g., a head-mounted device including smart glasses such as Google® Glass™, etc.), or a stationary computing device such as a desktop computer or PC (personal computer).

Each instance of computing device 102 in system 100 may be considered a client device, though this is not required. Each computing device 102 may comprise one or more applications 110 (e.g., a software application) and a data object manager 112. Application(s) 110 may be any type of software applications or service, such as database applications, social networking applications, messaging applications, financial services applications, news applications, search applications, productivity applications, file hosting applications, etc. Examples of such applications include a SQL (structured query language) database, Salesforce.com™, Facebook®, Twitter®, Instagram®, Yammer®, LinkedIn®, Yahoo!® Finance, The New York Times® (at www.nytimes.com), Google search, Microsoft® Bing, Google Docs™, Microsoft® Office 365, Dropbox™, etc. Application(s) 110 may be configured to receive, create, generate, interact with, download, upload, delete, modify, access, and/or transmit data objects (e.g., data object 124). Examples of data objects include, but are not limited to, a data file, a database object (e.g., a table, a directory, etc.), structured data, unstructured data, semi-structured data, a data container, etc. Each computing device 102 may be any type of stationary or mobile computing device, including a mobile computer or mobile computing device (e.g., a Microsoft® Surface® device, a laptop computer, a notebook computer, a tablet computer such as an Apple iPad™, a netbook, a smart phone etc.), a wearable computing device (e.g., a head-mounted device including smart glasses such as Google® Glass™ etc.), or a stationary computing device such as a desktop computer or PC (personal computer).

Data object manager 112 is configured to retrieve a set of conditions maintained centrally by management server 114. Using the set of conditions, data object manager 112 may determine and/or associate tag(s) 116 with data object 124. After determining and/or associating tag(s) 116 with data object 124, data object manager 112 may retrieve policies that are associated with tag(s) 116 and perform one or more actions (e.g., enforcement actions) in accordance with the policies. Any type of enforcement action may be performed with respect to a data object. For instance, an enforcement action may include, but is not limited to, encryption, controlling usage aspects (e.g., applying conditional access to users with certain clearance levels based on the tag or it may identify unauthorized entitlements that are applied to a data object that are not in accordance with the tag defined on the file, where in consequence it may revoke those entitlements), etc. In further detail, examples of enforcement actions include, but are not limited to, encrypting data object 124, placing restrictions on data object 124 (e.g., limiting the number of users that are allowed access to data object 124), watermarking data object 124, moving data object 124 to a particular location, quarantining data object 124 (e.g., moving to a quarantine folder), performing some type of modification to data object 124, etc.). Each data object manager 112 associated with a particular computing device of computing device 102 is configured to retrieve the same set of conditions and policies maintained by management service 114 and enforce the same policies with respect to the same data object (or instance thereof) due to the applied tag, regardless of the computing environment in which the particular computing device is located. This advantageously enables the data object to be uniformly acted upon across instances of data object manager 112. Accordingly, data objects that are classified as being private, confidential, etc., in one computing environment, will also be classified as such in another computing environment, thereby ensuring the data object is uniformly protected in accordance with the associated policies.

Figure 2:
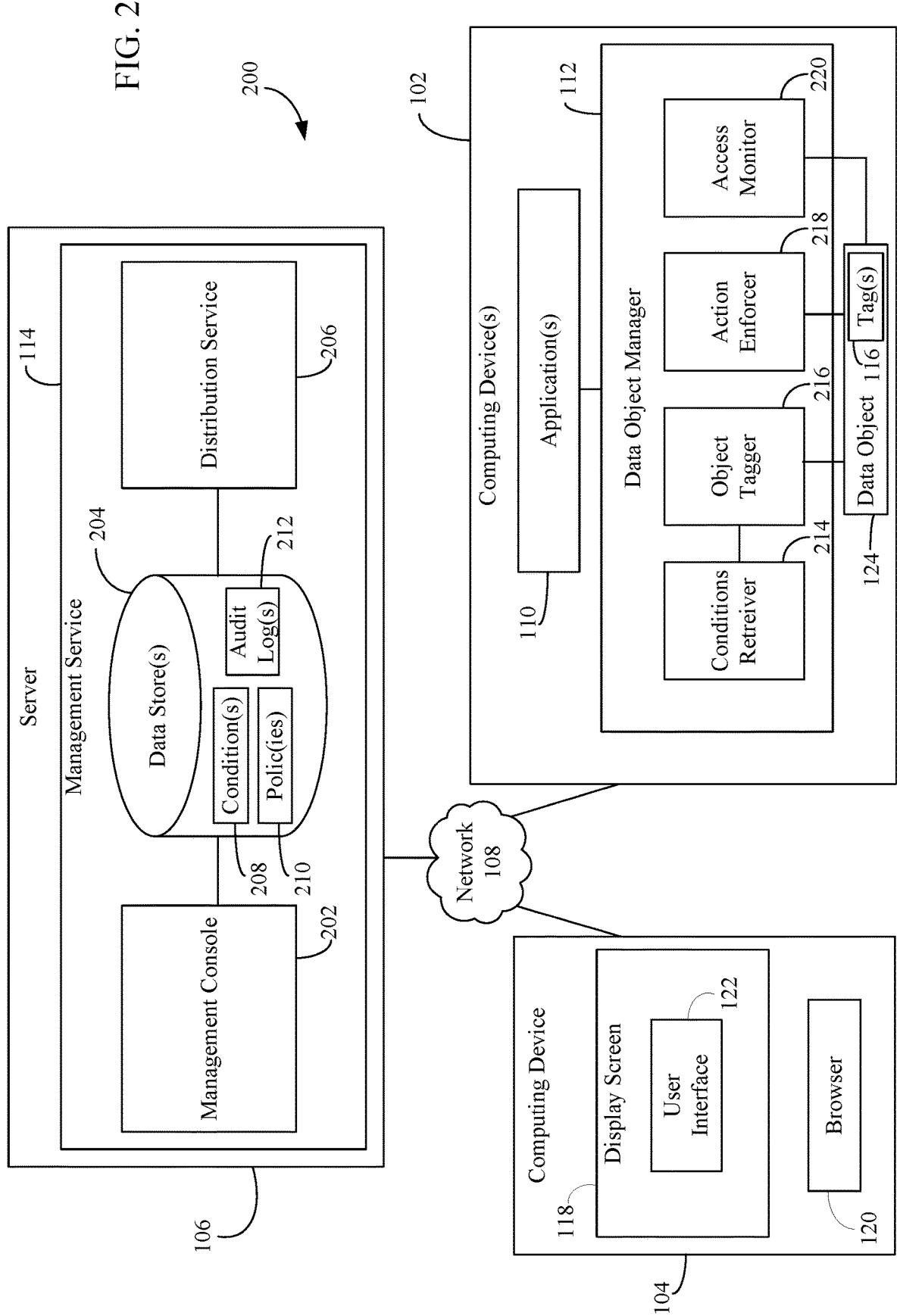
FIG. 2 is a block diagram of a system configured to tag a data object, determine a policy for the data object, and perform an action with respect to the data object in accordance with the policy, according to an example embodiment.

The tagging, policy determination, and enforcement actions to be performed with respect to a data object may be enabled in various ways in embodiments. For instance, FIG. 2 is a block diagram of a system 200 configured to tag a data object, determine a policy for the data object, and perform an action with respect to the data object in accordance with the policy, according to an example embodiment. As shown in FIG. 2, system 200 includes computing device 104, server 106, and computing device 102. System 200 is described as follows.

As shown in FIG. 2, management service 114 may include a management console 202, one or more data stores 204, and a distribution service 206. As described above with reference to FIG. 1, computing device 104 may access management console 202 to specify a set of conditions which are used to classify and tag a data object, specify a set of policies, and/or associate tags with the set of policies. The set of conditions and/or policies may be stored in data store(s) 204 (shown as condition(s) 208 and polic(ies) 210, respectively). In particular, condition(s) 208 may be defined via user interface 128 provided by management console 202. Using user interface 128, a user may be enabled to select and/or configure conditions and/or specify tags to be applied to a data object upon the conditions being met (e.g., evaluated to be true). The conditions may be selected from pre-defined types/categories, or alternatively, may be fully-defined by the user. The pre-defined types/categories may be searched for and/or filtered based on filter factors (e.g., via an industry such as Financial, Medical and Health, Privacy, etc.). The user is further enabled to save conditions (e.g., to data store(s) 204), discard conditions, modify conditions, delete tags (and their associated conditions), etc. The set of conditions and/or policies stored in data store(s) 204 may be enforceable in a plurality of different computing environments and retrievable by different computing devices located in those different computing environments.

As further shown in FIG. 2, data object manager 112 of computing device 104 may include a conditions retriever 214, an object tagger 216, an action enforcer 218, and an access monitor 220. To tag a data object, data object manager 112 may receive a data object 124 provided by application(s) 110, and conditions retriever 214 may query distribution service 206 for a set of conditions (e.g., condition(s) 208) which are to be evaluated with respect to the data object. Data store(s) 204 provide condition(s) 208 to distribution service 206, and distribution service 206 provides condition(s) 208 to data object manager 112. Upon receiving condition(s) 208, object tagger 216 may analyze data object 124 using condition(s) 208, automatically determine a classification for data object 124, and determine a tag (e.g., of tag(s) 116) for data object 124 that correspond to the classification. Condition(s) 208 may be used to analyze one or more properties of data object 124 (e.g., a location of data object 124 (a directory, a particular storage device partition, a particular storage device, a particular storage device collection/network, a particular region, etc.), an ownership of data object 124 (e.g., a user, an administrator, an enterprise or other entity, etc.), a content of data object 124 (e.g., textual information, a word processing document, a spreadsheet, private information, public information, an audio file, a video file, etc.), metadata associated with data object 124, or other parameters, such as a file size or file extension of data object 124. For instance, to determine whether a data object includes private information, a condition of condition(s) 208 may evaluate whether a data object contains particular keywords (e.g. "private", "confidential," "social security number," "credit card number") (and/or a particular number of occurrences thereof). If this condition holds true for the data object being analyzed, then object tagger 216 may automatically create a tag representative of the private data (e.g., the tag may be "private," "top secret," "confidential", etc.). It is noted that this example condition is merely provided for demonstrative purposes, and that an administrator may specify any type of condition to classify a data object.

In lieu of automatically determining tag(s) 116, the classification of data object 124 may be a manual process performed by a user and/or administrator, and/or a user or administrator may be enabled to manually adjust an automatically determined classification.

Once data object 124 has been tagged, tag(s) 116 remain with data object 124 when it is transported from one location to another (i.e., tag(s) 116 persist with data object 124 regardless of the location of data object 124 or the computing environment in which data object 124 resides).

Tag(s) 116 associated with data object 124 may be associated in any manner, including being stored in data object 124 (e.g., in a header, footer, or body of the data object, in a property field thereof, etc.) as attributes of data object 124, or may be stored in a table or other data structure linked to data object 124 (e.g., the table associates an identifier for data object 124 with tag(s) 116).

Action enforcer 218 is configured to query distribution service 210 to retrieve polic(ies) 224 that are associated with tag(s) 116. For example, action enforcer 218 may provide a tag identifier that identifies tag(s) 116 determined for data object 124 to distribution service 206, and distribution service 206 may retrieve polic(ies) 210 associated with tag(s) 116 from data store(s) 204 and provide retrieved polic(ies) 210 to action enforcer 218. For instance, distribution service 206 may provide a query that includes the tag identifiers to data store(s) 204, and data store(s) 204 may return polic(ies) 210 that are associated with tag(s) 116 identified by the tag identifiers. Polic(ies) 210 may be retrieved upon application(s) 110 being launched; however, the embodiments disclosed herein are not so limited. For example, polic(ies) 210 may be retrieved upon application(s) 110 performing a particular action (e.g., saving a file associated with data object 124). Action enforcer 218 may perform enforcement actions with respect to data object 124 in accordance with retrieved polic(ies) 210. Examples of enforcement actions include, but are not limited to, encrypting data object 124, placing restrictions on data object 124 (e.g., limiting the number of users that are allowed access to data object 124), watermarking data object 124, moving data object 124 to a particular location, quarantining data object 124, performing some type of modification to data object 124, etc.).

When the data object is moved to another location (e.g., to another computing device on the premises of a user or company or a cloud-based environment), the data object manager associated therewith may query distribution service 206 to obtain condition(s) 208 and/or polic(ies) 210 from data store(s) 204. If the data object is already tagged with tags, the data object manager may query distribution service 206 for polic(ies) 210, but not condition(s) 208 because the data object is already tagged.

In accordance with an embodiment, data object manager 112 is incorporated as part as application(s) 110. In accordance with another embodiment, data object manager 112 is a service that is communicatively coupled to application(s) 110 via one or more application programming interfaces.

Access monitor 220 is configured to monitor one or more accesses to data object 124 and transmit indications thereof. For example, each time a data object is accessed (e.g., created, opened, closed, modified, deleted, etc.), access monitor 220 detects the access, and provides an indicator to distribution service 206 that specifies the type of data access performed. For instance, access monitor 220 may be configured to directly detect the accesses, or to receive indications of the accesses from an operating system component involved in data object accesses. Access monitor 220 may further provide to distribution service 206 an identifier that identifies data object 124 (e.g., a file name), a tag identifier that identifies tag(s) 116 and/or a location of data object 124 (e.g., a directory, a particular storage device partition, a particular storage device, a particular storage device collection/network, a particular region, etc.). Using the indicators that specify the type of data accesses performed, distribution service 206 may store a record of the types of data accesses performed with respect to data object 124 as one or more audit logs 212 in data store(s) 204. Distribution service 206 may further associate the tag identifiers, the identifier that identifies data object 124 and/or the location of data object 124 with audit log(s) 212 maintained for data object 124. Computing device 102 that manages data object 124 (or an instance thereof) via a respective data object manager may provide the foregoing indicators to distribution service 206. Distribution service 206 may aggregate all the types of data accesses performed with respect to data object 124 across each computing device 102 and store the aggregated data accesses in audit log(s) 212. Data store(s) 204 may maintain audit log(s) 212 for any number of data objects maintained by any number of computing device 102 in any number of computing environments.

An administrator, using management console 202, may retrieve audit log(s) 212 for a data object maintained by instances of computing device 102 and advantageously track each data object in a centralized fashion regardless of where the data object is and has been located. The administrator may also be enabled to search for data objects (e.g., data object 124) based on their associated tags (e.g., tag(s) 116). For example, if the administrator wanted to determine where all of her/his data sensitive data objects are located, the administrator simply needs to search for the data objects based on a corresponding tag (e.g., "confidential," "top secret," "private," etc.). For instance, management console 202 may provide a search mechanism (e.g., a search box displayed via user interface 122) in which an administrator enters in one or more tag values (e.g., an alphanumerical string) corresponding to tags associated with a data object. Management service 114 may then search data store(s) 204 for audit log(s) 212 that are associated with the tags corresponding to the tag values and return a location of each data object having the tags (e.g., a location of computing device 102 and/or the computing environments in which the data object is located) to the user (e.g., via user interface 122).

It is noted that while data store(s) 204 is shown in FIG. 2 as being included in server 106, data store(s) 204 may located externally to server 106 and may be communicatively coupled thereto.

Figure 3:
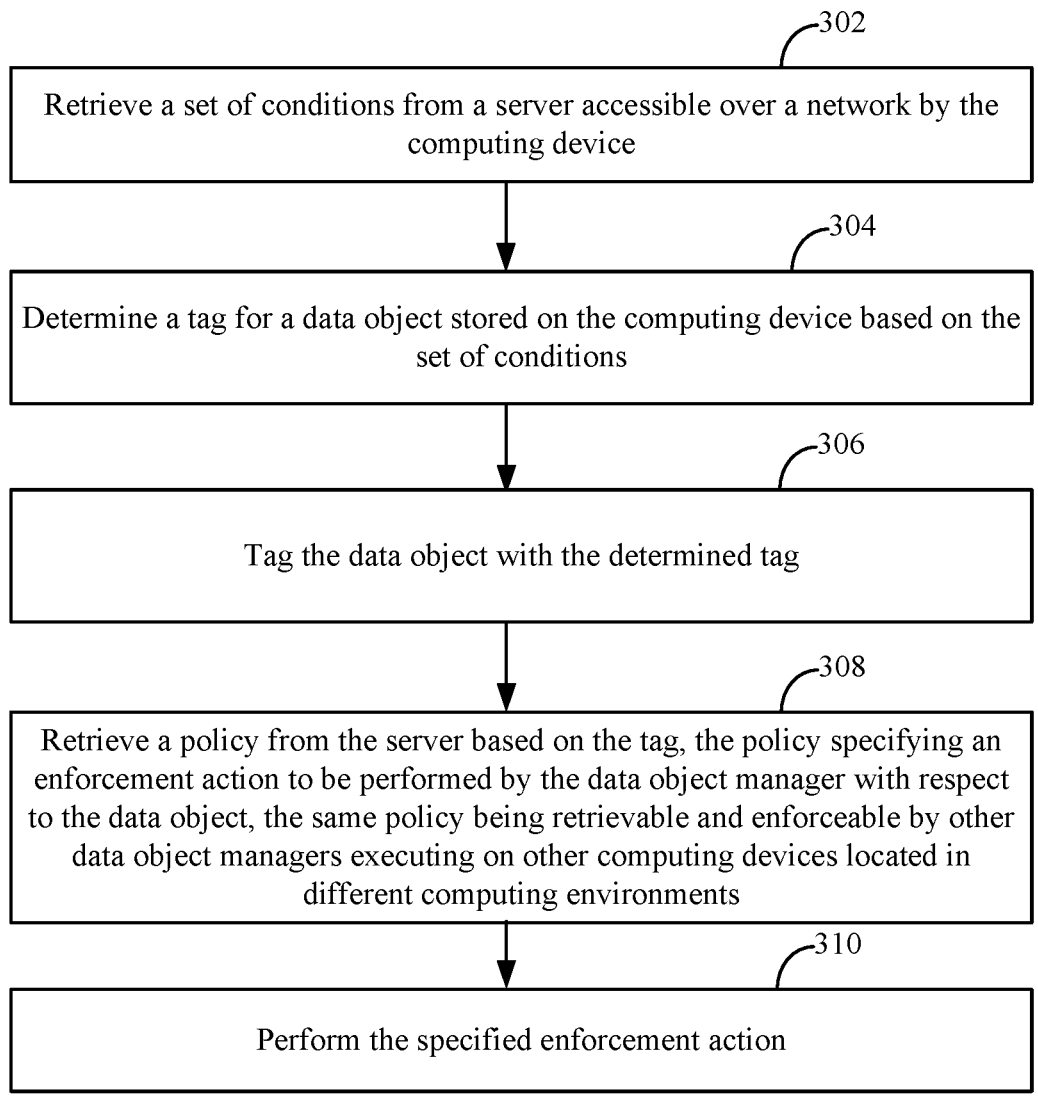
FIG. 3 depicts a flowchart for a method in a data object manager executing on a computing device for tagging a data object, retrieving a policy for the tagged data object, and performing an action with respect to the data object in accordance with the retrieved policy, according to an example embodiment.
Figure 4:
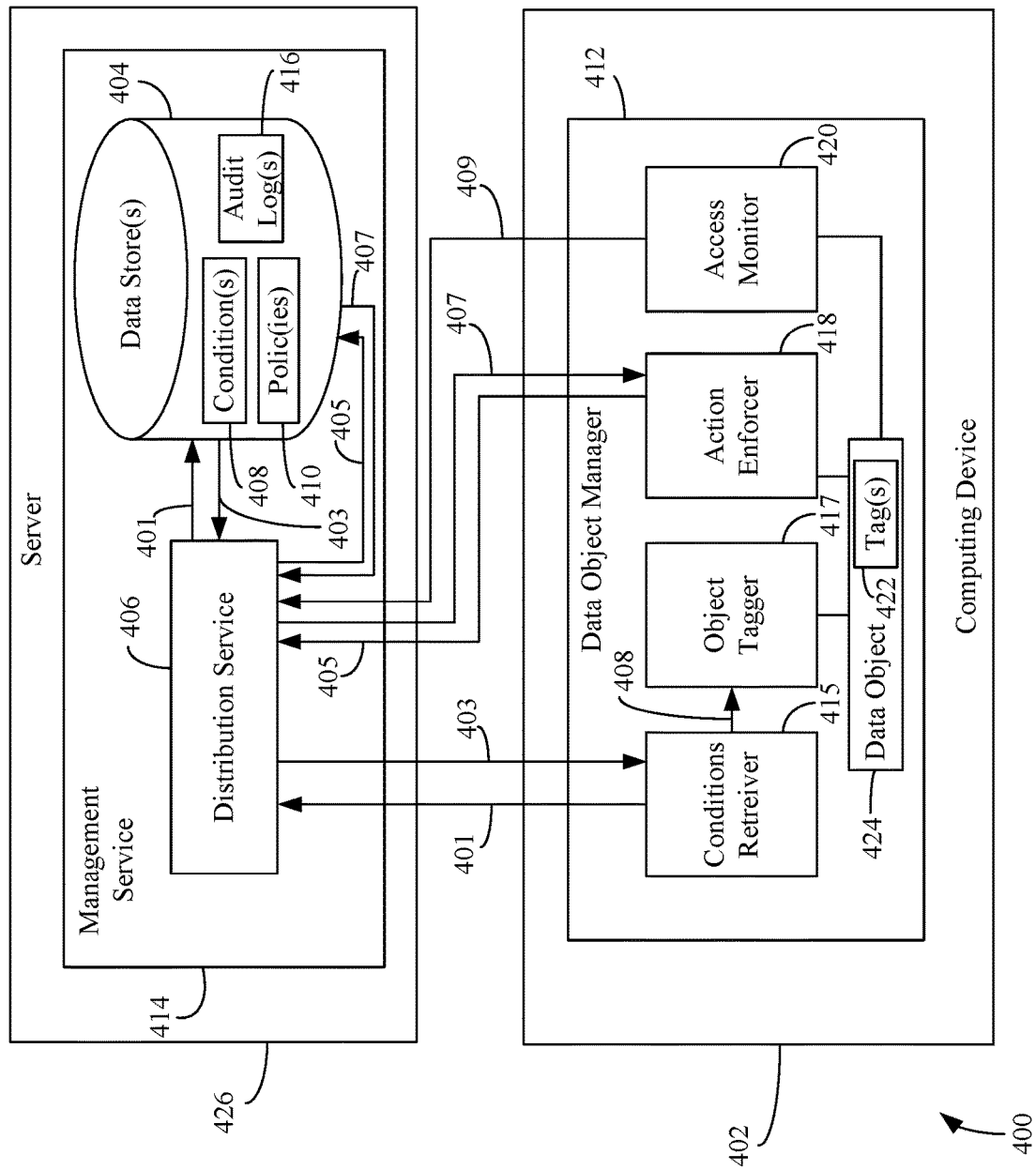
FIG. 4 is a block diagram of a computing device coupled to a server configured with a management service to manage policies for handling data objects by a computing device, according to an example embodiment.

Accordingly, a data object may be tagged, a policy for the tagged data object may be retrieved, and an action may be performed with respect to the data object in accordance with the retrieved policy in many ways. For instance, FIG. 3 shows a flowchart 300 for a method in a data object manager executing on a computing device for tagging a data object, retrieving a policy for the tagged data object, and performing an action with respect to the data object in accordance with the retrieved policy, according to an example embodiment. Flowchart 300 is described with respect to FIG. 4 for illustrative purposes. FIG. 4 shows a block diagram of a system 400 that includes a computing device 402 coupled to a server 426, according to an example embodiment. Computing device 402 and server 426 are examples of computing device 102 and server 106, as respectively described above with reference to FIGS. 1 and 2. As shown in FIG. 4, computing device 402 comprises a data object manager 412, which comprises a conditions retriever 415, an object tagger 417, an action enforcer 418, and access monitor 420, and a data object 424. Server 426 comprises a management service 414, which comprises a distribution service 406 and one or more data store(s) 404. Data object manager 412, conditions retriever 415, object tagger 417, action enforcer 418, and access monitor 420, are examples of data object manager 112, conditions retriever 214, object tagger 216, action enforcer 218, and access monitor 220, as respectively described above with reference to FIGS. 1 and 2. Management service 414, distribution service 406 and data store(s) 404 are examples of management service 114, distribution service 206 and data store(s) 204, as respectively described above with reference to FIGS. 1 and 2. As further shown in FIG. 2, data store(s) 404 may store a set of condition(s) 408, polic(ies) 410, and/or audit log(s) 412. Set of condition(s) 408, polic(ies) 410, and audit log(s) 412 are examples of set of condition(s) 208, polic(ies) 210, and audit log(s) 212, as respectively described above with reference to FIG. 2. In an embodiment, flowchart 300 may be performed by data object manager 412. Flowchart 300 and system 400 are described as follows.

Flowchart 300 begins with step 302. In step 302, a set of conditions is received from a server accessible over a network by the computing device. For example, with reference to FIG. 4, computing device 402 receives condition(s) 408 from server 426 over a network (e.g., network 108, as shown in FIG. 1). For instance, conditions retriever 415 may transmit a query 401 to distribution service 406 of server 426. In response, distribution service 406 may send query 401 to data store(s) 404 to retrieve condition(s) 408. Data store(s) 404 may provide a response 403 including condition(s) 408 to distribution service 406, which transmits response 403 to conditions retriever 415. Conditions retriever 415 provides condition(s) 408 to object tagger 417.

In step 304, a tag is determined for a data object stored on the computing device based on the set of conditions. For example, with reference to FIG. 4, object tagger 417 may determine tag(s) 422 for data object 424 based on condition(s) 408. For example, object tagger 417 may apply a tag that is associated with conditions by a user using user interface 128.

In accordance with one or more embodiments, the set of conditions is used to analyze at least one property of the data object. Any number and type of properties of the data object may be analyzed, including a location of the data object, an ownership of the data object, content of the data object, metadata associated with the data object, an application that accessed the data object, etc. In an embodiment, object tagger 417 may sequence through properties of the data object, comparing the property value of each property to condition values of the conditions, and selecting the tag based on a determined match between a property value and a condition value, the selected tag corresponding to the condition having the matching condition value.

In step 306, the data object is tagged with the determined tag. For example, with reference to FIG. 4, object tagger 417 may tag data object 424 with tag(s) 422. Tag(s) 422 are examples of tag(s) 116, as described above with reference to FIGS. 1 and 2.

In accordance with one or more embodiments, tagging the data object comprises tagging the data object with the tag by changing the data object to include the tag. For instance, tag(s) 422 associated with data object 424 may be stored in data object 424 (e.g., in a header, footer, or body of the data object, in a property field thereof, etc.) as attributes of data object 424. In another embodiment, a data object may be tagged with a tag by storing the tag in a table, file, or other data structure maintained in association with the data object (e.g., stored in a same folder, indicating the data object and the tag in a table as associated, etc.).

In step 308, a policy is retrieved from the server based on the tag. The policy specifies an enforcement action to be performed by the data object manager with respect to the data object. For example, with reference to FIG. 4, action enforcer 418 retrieves polic(ies) 410 from server 426. Note that same polic(ies) 410 are retrievable and enforceable by other data object managers executing on other computing devices located in different computing environments.

In accordance with one or more embodiments. a tag identifier that identifies the tag is provided to the server in a policy request (Note that the policy request may include multiple tags if the data object has been tagged by multiple tags). The server is configured to determine the policy based on the tag identifier and provide the determined policy to the computing device in response to the policy request. For instance, with reference to FIG. 4, action enforcer 418 may send a query 405 (policy request) including tag identifiers that identify tag(s) 422 to distribution service 406 of server 426. In response, distribution service 406 provides query 405 to data store(s) 404, and data store(s) 404 provide a response 407 that includes polic(ies) 410 that are associated with tag(s) 422 to distribution service 406. Distribution service 406 provides response 407 to action enforcer 418.

In step 310, the specified enforcement action is performed. For example, with reference to FIG. 4, action enforcer 418 performs the specified enforcement action. In accordance with one or more embodiments, the enforcement action comprises at least one of encrypting the data object, placing one or more restrictions on the data object, watermarking the data object, moving the data object to a particular location, quarantining the data object, or performing a modification to the data object. It is noted that action enforcer 418 may cause another entity (e.g., application(s)

110, as shown in FIGS. 1 and 2) to perform the enforcement action instead of performing the enforcement action itself.

As such, in the manner of flowchart 200, polic(ies) 410 are retrieval and enforceable by multiple data object managers executing on computing devices (e.g., instances of computing devices 102) located in different computing environments. In accordance with one or more embodiments, each of the different computing environments comprises a computing environment that is on the premise of a user or company that maintains the computing device or a cloud-based computing environment. By retrieving the same polic(ies) 410 to each of the computing environments, and enforcing the policies for data objects tagged with the corresponding tags, a uniform application of policies is applied across computing environments.

In accordance with one or more embodiments, a determination is made that an access to the data object has occurred and an identification of the determined access is provided to the server. For instance, with reference to FIG. 4, access monitor 420 may determine that an access to data object 424 has occurred and provide a request 409 that identifies the type of data object access to distribution service 406 of server 426.

In accordance with one or more embodiments, an identifier of the data object and a tag identifier that identifies the tag of the data object is also provided to the server. The server associates the identifier of the data object and the tag identifier to the identification of the determined access. For example, with reference to FIG. 4, request 409 may further include an identifier of data object 424 and a tag identifier that identifies tag(s) 422 of data object 424. In response, distribution service 406 creates and/or updates audit log(s) 412 associated with data object 424 to include an association between the identifier of data object 424 and/or the tag identifier with the type of data access that occurred (as identified by the identification of the determined access) with respect to computing device 402.

Figure 5:
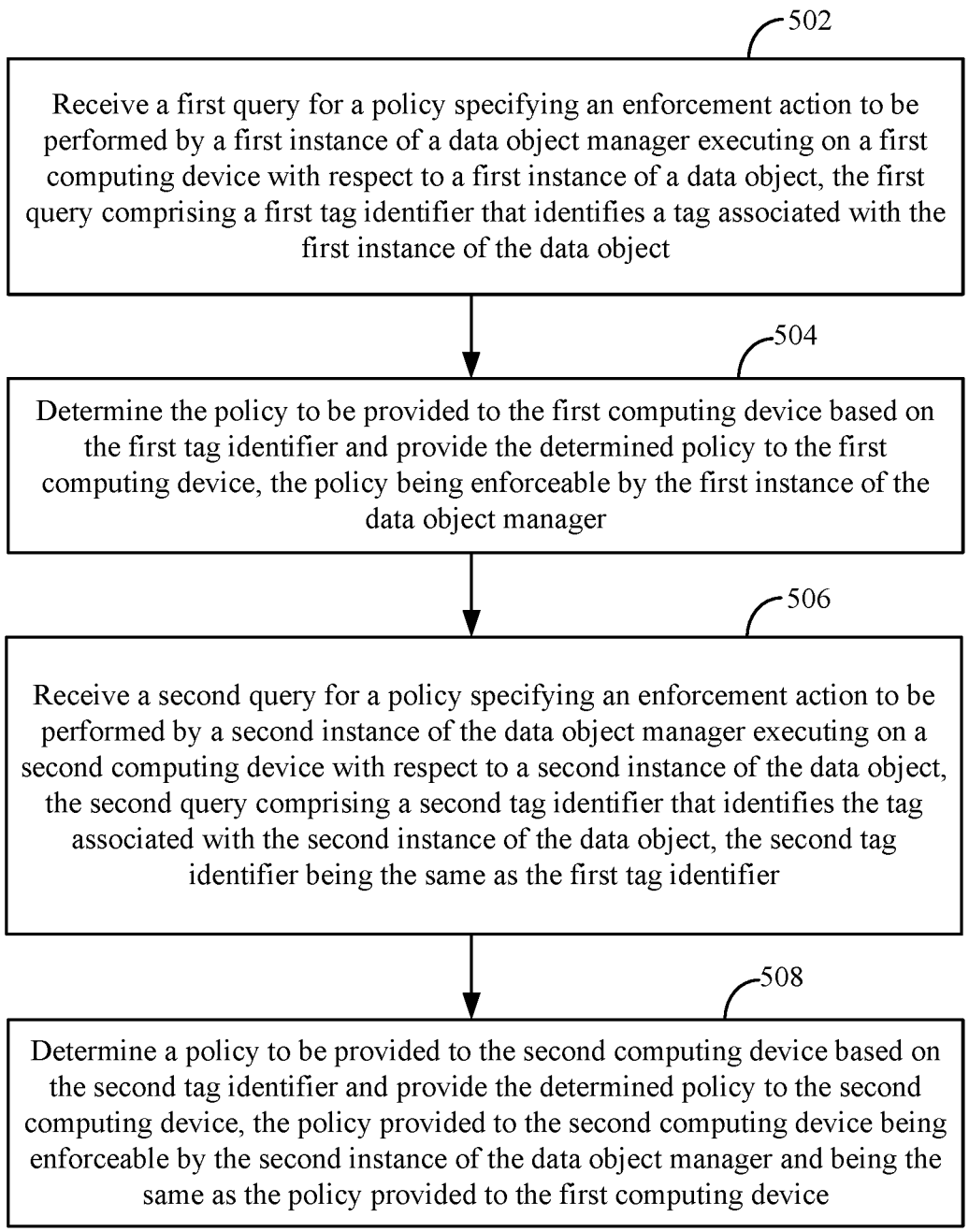
FIG. 5 depicts a flowchart for a method implemented by a management service of a server that is configured provide policies to a plurality of computing devices, according to an example embodiment.
Figure 6:
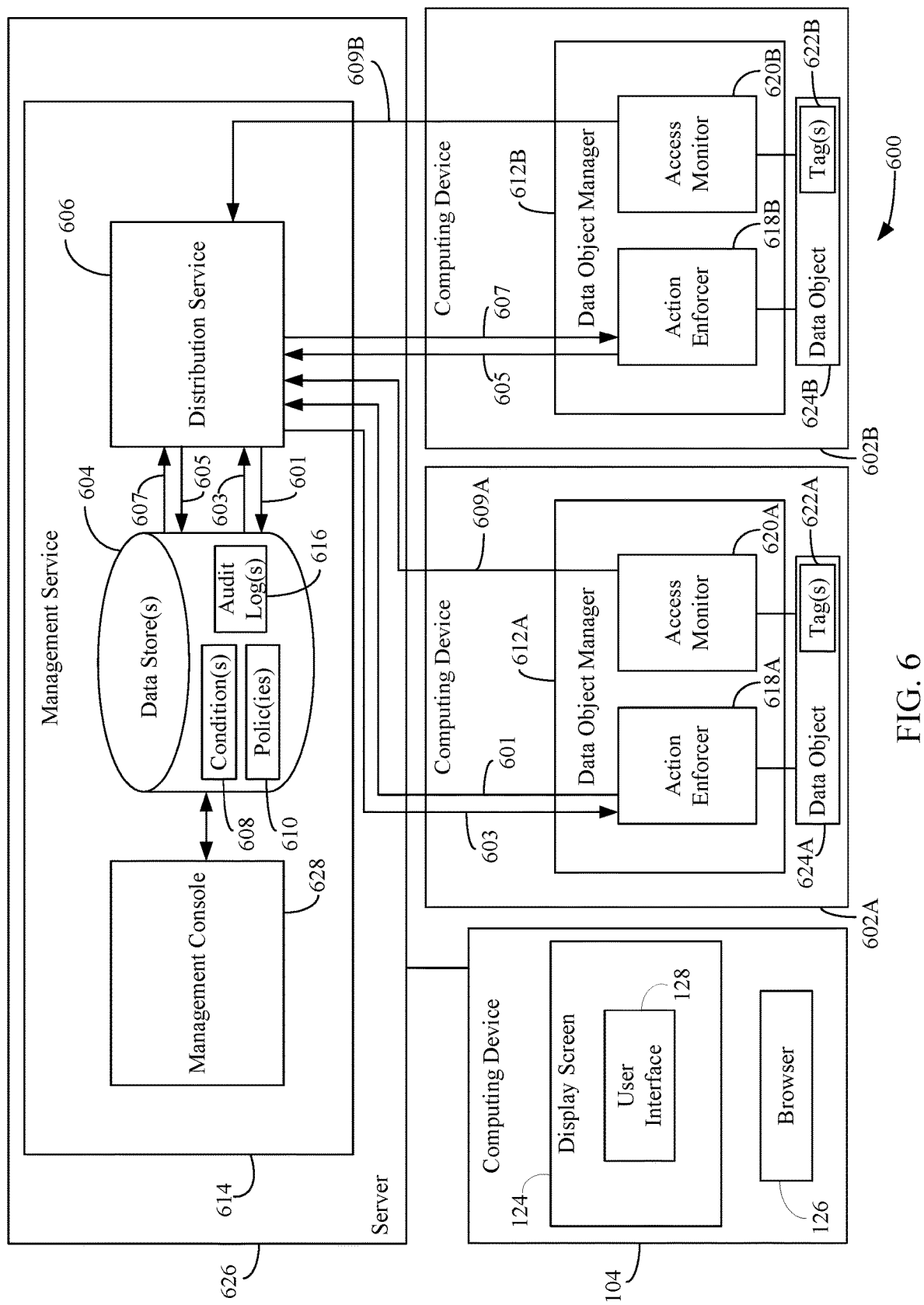
FIG. 6 is a block diagram of a computing device coupled to a server configured with a management service to manage policies applied to data objects by a plurality of computing devices, according to an example embodiment.

Management service 414 may be configured to provide policies to any number of computing device in many ways. For instance, FIG. 5 shows a flowchart 500 for a method implemented by a management service of a server that is configured provide policies to a plurality of computing devices, according to an example embodiment. In an embodiment, flowchart 500 may be implemented by a management service 614 shown in FIG. 6. FIG. 6 shows a block diagram of a system 600 that includes a server 626 coupled to computing device 104, a computing device 602A and a computing device 602B, according to an example embodiment. Server 626, computing device 602A, and computing device 602B are examples of server 106 and computing device 102, as respectively described above with reference to FIGS. 1 and 2. As shown in FIG. 6, server 626 comprises management service 614, which comprises a management console 628, one or more data stores 604, and a distribution service 606. Computing device 602A comprises a data object manager 612A, which comprises an action enforcer 618A, an access monitor 620A, and a data object 624A. Computing device 602B comprises a data object manager 612B, which comprises an action enforcer 618B, an access monitor 620B, and a data object 624B. Management console 628, data store(s) 604, and distribution service 606 are examples of management console 202, data store(s) 204, and distribution service 204, as described above with respect to FIG. 2. Data object managers 612A and 612B, action enforcer 618A and 618B, and access monitor 420A and 420B, are examples of data object manager 112, action enforcer 218, and access monitor 220, as respectively described above with reference to FIGS. 1 and 2. As further shown in FIG. 6, data store(s) 604 may store a set of condition(s) 608, polic(ies) 610, and/or audit log(s) 616. Set of condition(s) 608, polic(ies) 610, and audit log(s) 616 are examples of set of condition(s) 208, polic(ies) 210, and audit log(s) 212, as respectively described above with reference to FIG. 2.

Flowchart 500 and system 600 are described as follows, in particular illustrating how uniform application of policies to data objects across different computing environments is enabled by application of uniform tags to the data objects, according to embodiments.

Flowchart 500 begins with step 502. In step 502, a first query for a policy specifying an enforcement action to be performed by a first instance of a data object manager executing on a first computing device with respect to a first instance of a data object is received. The first query is received from the first computing device, which stores the first instance of the data object, and is accessible over a network by the server. The first query comprises a first tag identifier that identifies a tag associated with the first instance of the data object. For example, with reference to FIG. 6, distribution service 606 receives a first query 601 from action enforcer 618A of computing device 602A. First query 601 is for a policy (e.g., polic(ies) 610) that specify an enforcement action to be performed by data object manager 612A with respect to data object 624A. First query 601 may comprise a tag identifier that identifies tag(s) 622A associated with data object 624A.

In step 504, the policy to be provided to the first computing device is determined based on the first tag identifier, and the determined policy is provided to the first computing device. The policy is enforceable by the first instance of the data object manager. For example, with reference to FIG. 6, distribution service 606 provides first query 601 to data store(s) 604. Data store(s) 604 use the tag identifier included in first query 601 to search for polic(ies) 610 that are associated with the tags specified by the tag identifier and provides a response 603 that includes the matching polic(ies) 610 to distribution service 606. Distribution service 606 provides response 603 to action enforcer 618A.

In step 506, a second query for a policy specifying an enforcement action to be performed by a second instance of a data object manager executing on the second computing device with respect to a second instance of a data object is received. The second query is received from the second computing device, which stores the second instance of the data object, and is accessible over a network by the server. The second query comprises a second tag identifier that identifies a tag associated with the second instance of the data object. The second tag identifier is the same as the first tag identifier. For example, with reference to FIG. 6, distribution service 606 receives a second query 605 from action enforcer 618B of computing device 602B. Second query 605 is for a policy (e.g., polic(ies) 610) that specify an enforcement action to be performed by data object manager 612B with respect to data object 624B. Second query 605 may comprise a tag identifier that identifies tag(s) 622B associated with data object 624B. First computing device 602A and second computing device 602B use the same classification scheme to determine tags for their respective data object (i.e., data object 624A and 624B, which are two instances of the same data object). Therefore, each of data object 624A and data object 624B are classified with the same tags (i.e., tag(s) 622A and 622B are the same).

In step 508, a policy to be provided to the second computing device is determined based on the second tag identifier, and the determined policy is provided to the second computing device. The policy is enforceable by the second instance of the data object manager and is the same policy provided to the first computing device. For example, with reference to FIG. 6, distribution service 606 provides second query 605 to data store(s) 604. Data store(s) 604 use the tag identifier included in second query 605 to search for polic(ies) 610 that are associated with the tags specified by the tag identifier and provides a response 607 that includes the matching polic(ies) 610 to distribution service 606. Distribution service 606 provides response 607 to action enforcer 618B. Because data object 624B is the same as data object 624A, and are tagged by the same tag, action enforcer 618B of data object manager 612B receives the same policy as action enforcer 618A of data object manager 612A.

In accordance with one or more embodiments, server 626 is in a first computing environment and at least one of computing device 602A or second computing device 602B is in a second computing environment.

In accordance with one or more embodiments, the distribution service is further configured to receive, from the first computing device, a first identification of an access to the first instance of the data object via first computing device, receive, from the second computing device, a second identification of an access to the second instance of the data object via the second computing device, and store the first identification and the second identification in a data store coupled to the server. For example, with reference to FIG. 6, distribution service 606 may receive a first identification 609A that identifies access(es) to data object 624A from computing device 602A and may receive a first identification 609B that identifies access(es) to data object 624B from computing device 602B. Distribution service 606 may store first identification 609A and second identification 609B in data store(s) 604 as audit log(s) 616. An audit log of audit log(s) 616 may log/store access information in any manner, including in a table, array, list or any other data structure. For each log entry, the audit log may include any combination of access information, including one or more of an identifier for the data object, an identifier for the computing device making the access to the data object, an identifier for the data object manager reporting the access of the data object, a date/time of the data access to the data object, a type of access to the data object (e.g., read, write, modify, etc.), etc.

In accordance with one or more embodiments, a management console is configured to access the data store to provide an aggregated view of the accesses performed on the first instance and the second instance of the data object via the first computing device and the second computing device, the aggregated view being provided via a graphical user interface. For example, with reference to FIG. 6, management console 328 may access audit log(s) 616 stored in data store(s) 604 and provides an aggregated view of the accesses performed on data object 624A and data object 624B via user interface 128.

In accordance with one or more embodiments, a management console is configured to provide a graphical user interface that enables a user to specify a set of conditions that are used by at least one of the first instance of the data object manager to analyze at least one property of the first instance of the data object or the second instance of the data object manager to analyze at least one property of the second instance of the data object, the tag associated with the first instance of the data object being determined based on the analysis of the at least one property of the first instance of the data object, the tag associated with the second instance of the data object being determined based on the analysis of the at least one property of the second instance of the data object. For example, with reference to FIG. 6, management console 628 is configured to provide user interface 128 that enables a user to specify condition(s) 608 that are used by data object manager 612A to analyze at least one property of data object 624A or used by data object manager 612B to analyze at least one property of data object 624B. Tag(s) 622A associated with data object 624A are determined based on the analysis of the at least one property of data object 624A, and tag(s) 622B associated with data object 624B are determined based on the analysis of the at least one property of data object 624B.

III. Example Mobile and Stationary Device Embodiments

The systems described above, including the classification, policy determination, and data protection embodiments described in reference to FIGS. 1-6, may be implemented in hardware, or hardware combined with one or both of software and/or firmware. For example, management service 114, management service 414, management service 614, data object manager 112, data object manager 412, data object manager 612A, data manager 612B, and/or each of the components described therein, and flowchart 300 and/or flowchart 500 be each implemented as computer program code/instructions configured to be executed in one or more processors and stored in a computer readable storage medium. Alternatively, management service 114, management service 414, management service 614, data object manager 112, data object manager 412, data object manager 612A, data manager 612B, and/or each of the components described therein, and flowchart 300 and/or flowchart 500 may be implemented as hardware logic/electrical circuitry. In an embodiment, management service 114, management service 414, management service 614, data object manager 112, data object manager 412, data object manager 612A, data manager 612B, and/or each of the components described therein, and flowchart 300 and/or flowchart 500 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
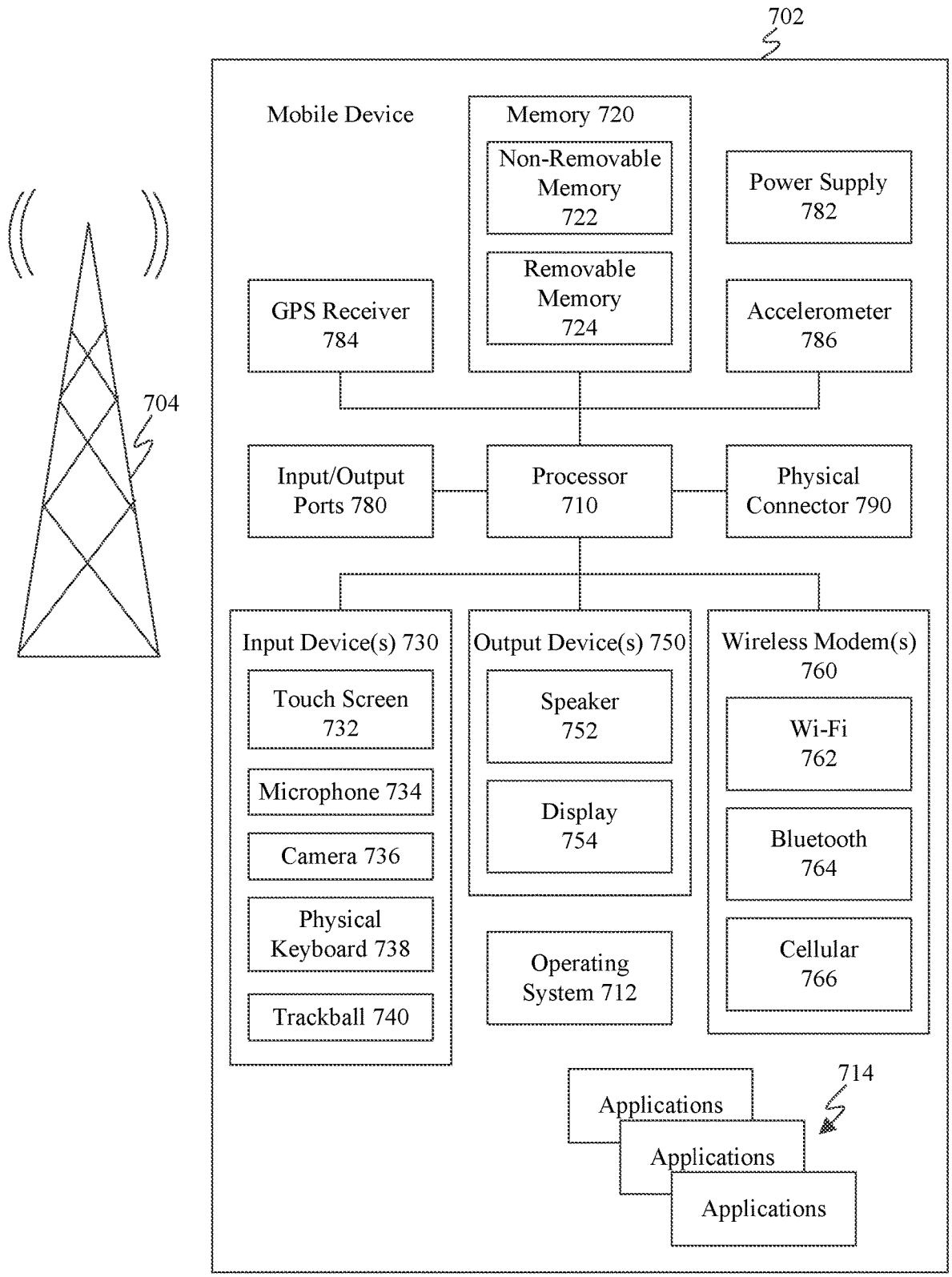
FIG. 7 is a block diagram of an exemplary user device in which embodiments may be implemented.

FIG. 7 shows a block diagram of an exemplary mobile device 700 including a variety of optional hardware and software components, shown generally as components 702. Any number and combination of the features/elements of management service 114, management service 414, management service 614, data object manager 112, data object manager 412, data object manager 612A, data manager 612B, and/or each of the components described therein, and flowchart 300 and/or flowchart 500 may be implemented as components 702 included in a mobile device embodiment, as well as additional and/or alternative features/elements, as would be known to persons skilled in the relevant art(s). It is noted that any of components 702 can communicate with any other of components 702, although not all connections are shown, for ease of illustration. Mobile device 700 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 704, such as a cellular or satellite network, or with a local area or wide area network.

The illustrated mobile device 700 can include a controller or processor referred to as processor circuit 710 for performing such tasks as signal coding, image processing, data processing, input/output processing, power control, and/or other functions. Processor circuit 710 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 710 may execute program code stored in a computer readable medium, such as program code of one or more applications 714, operating system 712, any program code stored in memory 720, etc. Operating system 712 can control the allocation and usage of the components 702 and support for one or more application programs 714 (a.k.a. applications, "apps", etc.). Application programs 714 can include common mobile computing applications (e.g., email applications, calendars, contact managers, web browsers, messaging applications) and any other computing applications (e.g., word processing applications, mapping applications, media player applications).

As illustrated, mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running the operating system 712 and the applications 714. Example data can include web pages, text, images, sound files, video data, or other data sets to be sent to and/or received from one or more network servers or other devices via one or more wired or wireless networks. Memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 720. These programs include operating system 712, one or more application programs 714, and other program modules and program data. Examples of such application programs or program modules may include, for example, computer program logic (e.g., computer program code or instructions) for implementing the systems described above, including the classification, policy determination, and data protection embodiments described in reference to FIGS. 1-6.

Mobile device 700 can support one or more input devices 730, such as a touch screen 732, microphone 734, camera 736, physical keyboard 738 and/or trackball 740 and one or more output devices 750, such as a speaker 752 and a display 754.

Other possible output devices (not shown) can include piezoelectric or other haptic output devices. Some devices can serve more than one input/output function. For example, touch screen 732 and display 754 can be combined in a single input/output device. The input devices 730 can include a Natural User Interface (NUI).

Wireless modem(s) 760 can be coupled to antenna(s) (not shown) and can support two-way communications between processor circuit 710 and external devices, as is well understood in the art. The modem(s) 760 are shown generically and can include a cellular modem 766 for communicating with the mobile communication network 704 and/or other radio-based modems (e.g., Bluetooth 764 and/or Wi-Fi 762). Cellular modem 766 may be configured to enable phone calls (and optionally transmit data) according to any suitable communication standard or technology, such as GSM, 3G, 4G, 5G, etc. At least one of the wireless modem(s) 760 is typically configured for communication with one or more cellular networks, such as a GSM network for data and voice communications within a single cellular network, between cellular networks, or between the mobile device and a public switched telephone network (PSTN).

Mobile device 700 can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components 702 are not required or all-inclusive, as any components can be not present and other components can be additionally present as would be recognized by one skilled in the art.

Figure 8:
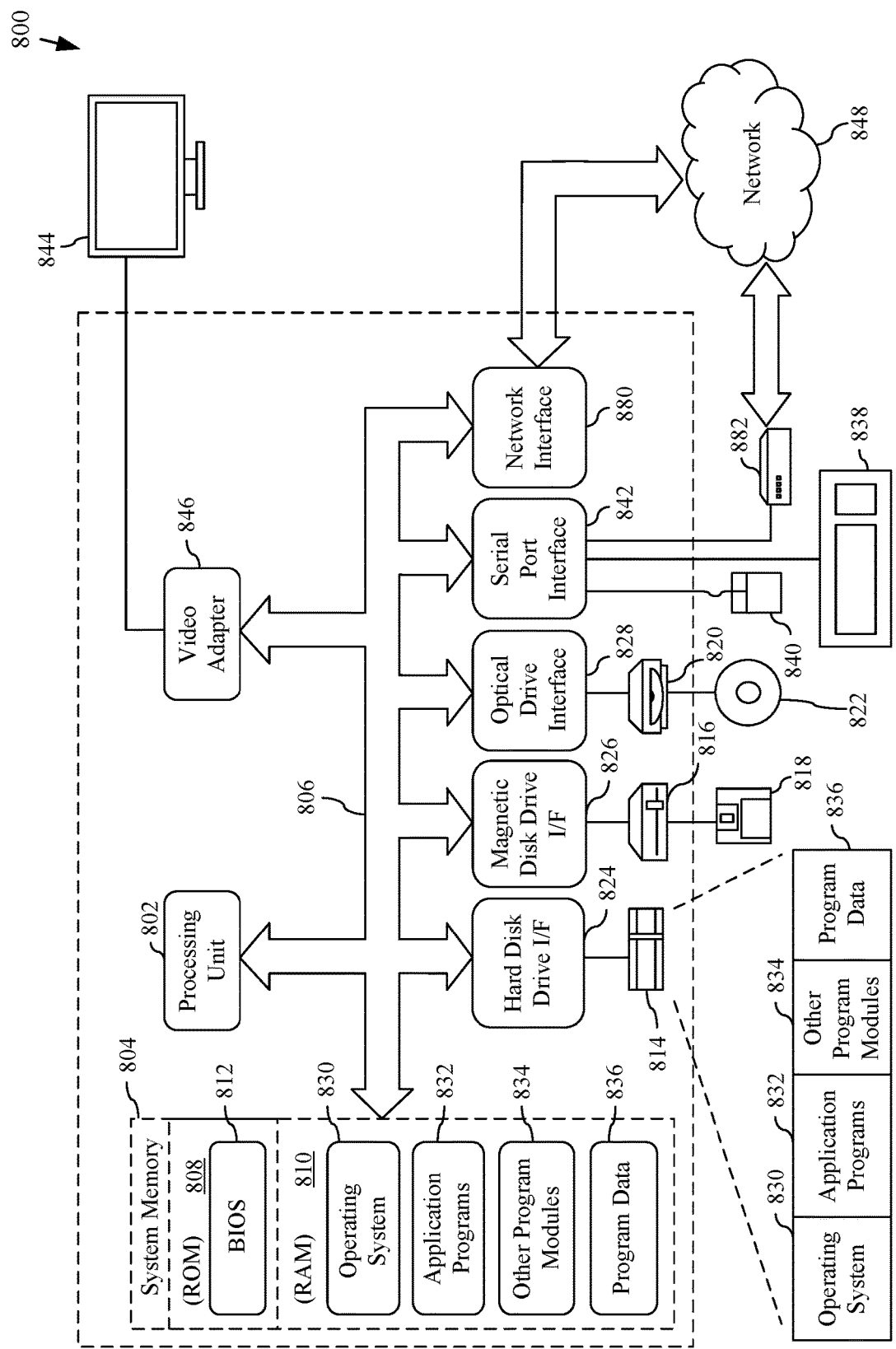
FIG. 8 is a block diagram of an example computing device that may be used to implement embodiments.

Furthermore, FIG. 8 depicts an exemplary implementation of a computing device 800 in which embodiments may be implemented, including management service 114, management service 414, management service 614, data object manager 112, data object manager 412, data object manager 612A, data manager 612B, and/or each of the components described therein, and flowchart 300 and/or flowchart 500. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing the systems described above, including the classification, policy determination, and data protection embodiments described in reference to FIGS. 1-6.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to generally refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media (including system memory 804 of FIG. 8). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 852, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

A method in a data object manager executing on a computing device is described herein. The method includes: retrieving a set of conditions from a server accessible over a network by the computing device; determining a tag for a data object stored on the computing device based on the set of conditions; tagging the data object with the determined tag; retrieving a policy from the server based on the tag, the policy specifying an enforcement action to be performed by the data object manager with respect to the data object, the same policy being retrievable and enforceable by other data object managers executing on other computing devices located in different computing environments; and performing the specified enforcement action.

In one embodiment of the foregoing method, the enforcement action comprises at least one of: encrypting the data object; placing one or more restrictions on the data object; watermarking the data object; moving the data object to a particular location; quarantining the data object; or performing a modification to the data object.

In another embodiment of the foregoing method, the set of conditions is used to analyze at least one property of the data object, the at least one property comprising: a location of the data object; an ownership of the data object; content of the data object; metadata associated with the data object; or an application that accessed the data object.

In a further embodiment of the foregoing method, retrieving the policy comprises: providing a tag identifier that identifies the tag to the server, the server configured to determine the policy based on the tag identifier and provide the determined policy to the computing device.

In yet another embodiment of the foregoing method, each of the different computing environments comprises: a computing environment that is on the premise of a user or company that maintains the computing device; or a cloud-based computing environment.

In still another embodiment of the foregoing method, the method further includes: determining that an access to the data object has occurred; and providing an identification of the determined access to the server.

In yet another embodiment of the foregoing method, the method further includes: providing an identifier of the data object and a tag identifier that identifies the tag of the data object to the server, the server associating the identifier of the data object and the tag identifier to the identification of the determined access.

In still another embodiment of the foregoing method, tagging the data object comprises: tagging the data object with the tag by changing the data object to include the tag.

A computer-readable storage medium having program instructions recorded thereon for a data object manager that, when executed by at least one processor, perform a method on a computing device is also described herein. The method includes retrieving a set of conditions from a cloud-based server remotely located from the computing device; determining a tag for the data object based on the set of conditions; tagging the data object with the determined tag; retrieving a policy from the cloud-based server based on the tag, the policy specifying an enforcement action to be performed by the data object manager with respect to the data object, the same policy being retrievable and enforceable by other data object managers executing on other computing devices located in different computing environments; and performing the specified enforcement action.

In an embodiment of the foregoing computer-readable storage medium, the enforcement action comprises at least one of: encrypting the data object; placing one or more restrictions on the data object; watermarking the data object; moving the data object to a particular location; quarantining the data object; or performing a modification to the data object.

In another embodiment of the foregoing computer-readable storage medium, the set of conditions is used to analyze at least one property of the data object, the at least one property comprising: a location of the data object; an ownership of the data object; content of the data object; metadata associated with the data object; or an application that accessed the data object.

In a further embodiment of the foregoing computer-readable storage medium, retrieving the policy comprises: providing a tag identifier that identifies the tag to the server, the server configured to determine the policy based on the tag identifier and provide the determined policy to the computing device.

In yet another embodiment of the foregoing computer-readable storage medium, the method further includes: determining that an access to the data object has occurred; and providing an identification of the determined access to the server.

In still another embodiment of the foregoing computer-readable storage medium, the method further includes: providing an identifier of the data object and a tag identifier that identifies the tag of the data object to the server, the server associating the identifier of the data object and the tag identifier to the identification of the determined access.

In yet another embodiment of the foregoing method, tagging the data object comprises: tagging the data object with the tag by changing the data object to include the tag.

A server is further described herein. The server includes at least one processor circuit and at least one memory that stores program code configured to be executed by the at least one processor circuit. The program code includes a distribution service configured to: receive, from a first computing device storing a first instance of a data object and that is accessible over a network by the server, a first query for a policy specifying an enforcement action to be performed by a first instance of a data object manager executing on the first computing device with respect to the first instance of the data object, the first query comprising a first tag identifier that identifies a tag associated with the first instance of the data object; determine the policy to be provided to the first computing device based on the first tag identifier and provide the determined policy to the first computing device, the policy being enforceable by the first instance of the data object manager; receive, from a second computing device storing a second instance of the data object and that is accessible over a network by the server, a second query for a policy specifying an enforcement action to be performed by a second instance of the data object manager executing on the second computing device with respect to the second instance of the data object, the second query comprising a second tag identifier that identifies the tag associated with the second instance of the data object, the second tag identifier being the same as the first tag identifier; and determine a policy to be provided to the second computing device based on the second tag identifier and provide the determined policy to the second computing device, the policy provided to the second computing device being enforceable by the second instance of the data object manager and being the same as the policy provided to the first computing device.

In an embodiment of the server, the distribution service further configured to: receive, from the first computing device, a first identification of an access to the first instance of the data object via first computing device; receive, from the second computing device, a second identification of an access to the second instance of the data object via the second computing device; store the first identification and the second identification in a data store coupled to the server.

In another embodiment of the server, the program code further comprises: a management console configured to access the data store to provide an aggregated view of the accesses performed on the first instance and the second instance of the data object via the first computing device and the second computing device, the aggregated view being provided via a graphical user interface.

In yet another embodiment of the server, the program code further comprises: a management console configured to provide a graphical user interface that enables a user to specify a set of conditions that are used by at least one of the first instance of the data object manager to analyze at least one property of the first instance of the data object or the second instance of the data object manager to analyze at least one property of the second instance of the data object, the tag associated with the first instance of the data object being determined based on the analysis of the at least one property of the first instance of the data object, the tag associated with the second instance of the data object being determined based on the analysis of the at least one property of the second instance of the data object.

In still another embodiment of the server, the server is in a first computing environment and at least one of the first computing device or the second computing device is in a second computing environment.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a data object manager executing on a computing device, comprising:
retrieving a set of conditions utilized for generating tags from a server accessible over a network by the computing device, the set of conditions being used to analyze at least one property of a data object stored on the computing device;
determining a tag for the data object stored on the computing device based on the set of conditions;
tagging the data object with the determined tag;
retrieving a policy from the server based on the tag, the policy specifying an enforcement action to be performed by the data object manager with respect to the data object, the same policy being retrievable and enforceable by other data object managers executing on other computing devices located in different computing environments; and
performing the specified enforcement action.

2. The method of claim 1, wherein the enforcement action comprises at least one of:
encrypting the data object;
placing one or more restrictions on the data object;
watermarking the data object;
moving the data object to a particular location;
quarantining the data object; or
performing a modification to the data object.

3. The method of claim 1, the at least one property comprising:
a location of the data object;
an ownership of the data object;
content of the data object;
metadata associated with the data object; or
an application that accessed the data object.

4. The method of claim 1, wherein said retrieving the policy comprising:
providing a tag identifier that identifies the tag to the server, the server configured to determine the policy based on the tag identifier and provide the determined policy to the computing device.

5. The method of claim 1, wherein each of the different computing environments comprises:
a computing environment that is on the premise of a user or company that maintains the computing device; or
a cloud-based computing environment.

6. The method of claim 1, further comprising:
determining that an access to the data object has occurred; and
providing an identification of the determined access to the server.

7. The method of claim 6, further comprising:
providing an identifier of the data object and a tag identifier that identifies the tag of the data object to the server, the server associating the identifier of the data object and the tag identifier to the identification of the determined access.

8. The method of claim 1, wherein said tagging the data object comprises:
tagging the data object with the tag by changing the data object to include the tag.

9. A computer-readable storage medium having program instructions recorded thereon for a data object manager that, when executed by at least one processor, perform a method on a computing device, the method comprising:
retrieving a set of conditions utilized for generating tags from a cloud-based server remotely located from the computing device, the set of conditions being used to analyze at least one property of a data object stored on the computing device;
determining a tag for the data object based on the set of conditions;
tagging the data object with the determined tag;
retrieving a policy from the cloud-based server based on the tag, the policy specifying an enforcement action to be performed by the data object manager with respect to the data object, the same policy being retrievable and enforceable by other data object managers executing on other computing devices located in different computing environments; and
performing the specified enforcement action.

10. The computer-readable storage medium of claim 9, wherein the enforcement action comprises at least one of:
encrypting the data object;
placing one or more restrictions on the data object;
watermarking the data object;
moving the data object to a particular location;
quarantining the data object; or
performing a modification to the data object.

11. The computer-readable storage medium of claim 9, the at least one property comprising:
a location of the data object;
an ownership of the data object;
content of the data object;
metadata associated with the data object; or
an application that accessed the data object.

12. The computer-readable storage medium of claim 9, wherein said retrieving the policy comprising:
providing a tag identifier that identifies the tag to the cloud-based server, the cloud-based server configured to determine the policy based on the tag identifier and provide the determined policy to the computing device.

13. The computer-readable storage medium of claim 9, the method further comprising:
determining that an access to the data object has occurred; and
providing an identification of the determined access to the cloud-based server.

14. The computer-readable storage medium of claim 13, the method further comprising:
providing an identifier of the data object and a tag identifier that identifies the tag of the data object to the server, the server associating the identifier of the data object and the tag identifier to the identification of the determined access.

15. The computer-readable storage medium of claim 9, wherein said tagging the data object comprises:
tagging the data object with the tag by changing the data object to include the tag.

16. A computing device, comprising:
at least one processor circuit; and
at least one memory that stores program code configured to be executed by the at least one processor circuit, the program code comprising:
a data object manager configured to:
retrieve a set of conditions utilized for generating tags from a server accessible over a network by the computing device, the set of conditions being used to analyze at least one property of a data object stored on the computing device;

determine a tag for the data object stored on the computing device based on the set of conditions;
tag the data object with the determined tag;
retrieve a policy from the server based on the tag, the policy specifying an enforcement action to be performed by the data object manager with respect to the data object, the same policy being retrievable and enforceable by other data object managers executing on other computing devices located in different computing environments; and
perform the specified enforcement action.

17. The computing device of claim 16, wherein the enforcement action comprises at least one of:
encrypting the data object;
placing one or more restrictions on the data object;
watermarking the data object;
moving the data object to a particular location;
quarantining the data object; or
performing a modification to the data object.

18. The computing device of claim 16, the at least one property comprising:
a location of the data object;
an ownership of the data object;
content of the data object;
metadata associated with the data object; or
an application that accessed the data object.

19. The computing device of claim 16, wherein the data object manager is configured to retrieve the policy by providing a tag identifier that identifies the tag to the server, the server configured to determine the policy based on the tag identifier and provide the determined policy to the computing device.

20. The computing device of claim 16, wherein each of the different computing environments comprises:
a computing environment that is on the premise of a user or company that maintains the computing device; or
a cloud-based computing environment.

* * * * *